Dec. 13, 1949 — C. L. HALL — 2,491,447
MOUNTING CONSTRUCTION
Filed March 22, 1946
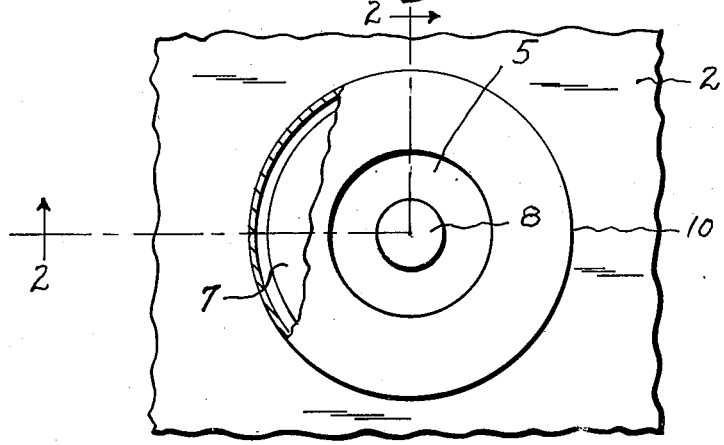
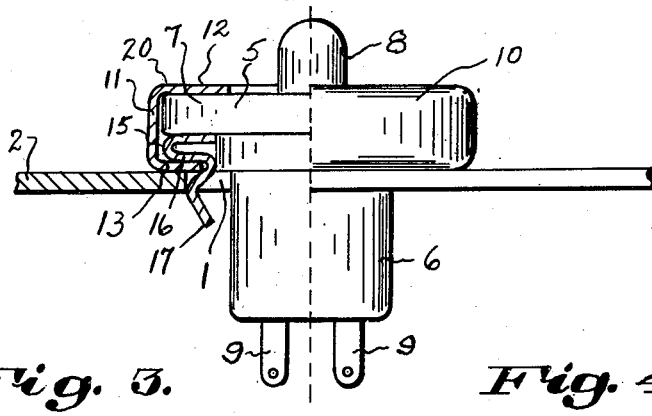
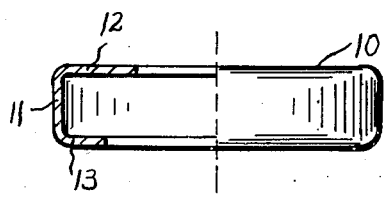
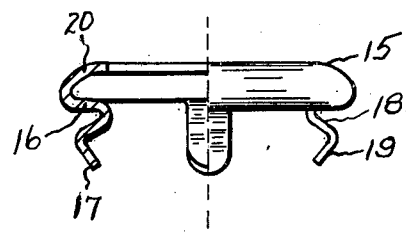
Inventor
Charles L. Hall.
By John Todd
Attorney Patented Dec. 13, 1949

2,491,447

UNITED STATES PATENT OFFICE 2,491,447

MOUNTING CONSTRUCTION

Charles L. Hall, Detroit, Mich., assignor to United-Carr Fastener Corporation, Cambridge, Mass., a corporation of Massachusetts Application March 22, 1946, Serial No. 656,295

2 Claims. (Cl. 173—339)

The present invention relates to improvements in mounting constructions such as those for mounting a device in an apertured support and aims generally to improve existing mounting constructions of that type.

More particularly, the invention has for one of its primary objects the provision of a simple and economical mounting construction whereby a device such as a switch may be easily and readily replaceably mounted in an apertured support, as for example an instrument panel of a motor vehicle or other structure.

The above and other objects of the invention will be apparent to those skilled in the art from a consideration of the accompanying drawings and annexed specification, illustrating and describing one preferred embodiment of the invention.

In the drawings:

Fig. 1 is a top plan view of a fragmentary portion of a support showing an electric switch mounted therein by one preferred embodiment of my improved mounting construction;

Fig. 2 is a sectional elevation of the switch installation shown in Fig. 1 as taken on the line 2—2 of Fig. 1, the switch being shown in elevation as its feature of construction forms no part of the present invention;

Fig. 3 is a vertical sectional elevation of the retaining member of the mounting; and Fig. 4 is a sectional elevation of the fastener member of the mounting.

Referring to the drawings, the improved mounting of the invention is adapted to mount a device or part 5 to be applied in an aperture 1 of a support 2. The mounting construction is especially adaptable for mounting an electric switch, for example an engine starting switch in a thin sheet metal support, for example the instrument panel of a motor car. Therefore, the part 5 is illustrated as a switch having an elongated substantially cylindrical body 6 provided with radially extending means, such as a rim 7 adjacent one end thereof. The switch is provided with switching means (not shown) which may be operated by the push button 8 for establishing an electrical circuit between spaced contacts 9 as will be understood.

The mounting means preferably is of two-part construction consisting of a part-retaining member 10 and a fastener member 15 adapted when assembled to resiliently grip the rim portion 7 of the part 5 between them and to securely mount the assembly in the aperture 1 of the support 2 by a snap fastener action.

Conveniently the part-retaining member may be an annular wall 11, when the rim 7 is cylindrical, loosely surrounding the rim, and formed at its outer and inner edges with flanged device-embracing and support-engaging portions 12 and 13 respectively. As here shown, the portions 12 and 13 are spaced inturned flanges on the wall 11, so that the retainer member may be of annular or ring-like channel cross section, as shown in Figs. 2 and 3.

The fastener member 15 preferably comprises a rim portion 16 adapted to be loosely positioned in the channel of the retaining member 10 and seat upon the outer face of the support-engaging portion 13 and is provided at spaced intervals along its inner annular edge with attaching elements in the form of angularly extending resilient fingers 17. The fingers 17 have portions at an acute angle to the rim 16 presenting diverging portions 18 and outer converging nose portions 19 (Fig. 4), so as to have snap-fastening engagement with the walls of the aperture 1 of the support 2 whereby the assembly may be securely attached to the support and readily removed therefrom simply by an axial thrust or pull.

The device or part 5 to be mounted is preferably gripped between the retaining member 10 and fastener member 15 and the invention provides resilient means associated with the rim 16 for engaging a part of the device 5, for example the inner face of the rim 7 and pressing the rim against the device-embracing flange 12 of the retainer member. In the embodiment shown such resilient means may comprise a resilient flange 20 extending above the rim portion 16 and united therewith along an edge thereof, for example the outer edge.

In use, the parts are assembled as shown in Fig. 2, the rim portion 7 of the device 5 being resiliently but securely gripped between the device-embracing portion 12 of the retainer 10 and the fastener member 15. The assembly may then be mounted in the aperture simply by pushing upon the retainer to force the fingers 17 past the aperture walls of the support with which they lock with a snap-fastener action. When inspection or repair of the switch terminals is desired, the mounting may be readily removed therefrom by a simple pull and thereafter replaced.

From the above it will be seen that the invention provides a simple, economical yet efficient mounting for switches and like devices permitting them to be readily and securely mounted on a support without the use of screw and like fastening devices and without the necessity of maintaining close tolerances between the mounting parts and the device to be mounted.

Although I have described one preferred embodiment of the invention, I do not wish to be limited thereby because the scope of my invention is best defined by the following claims.

I claim:

1. A removable mounting construction for electrical switches and the like devices formed with a substantially cylindrical body having a radially projecting rim adjacent one end thereof: said mounting comprising a device-retaining member with an annular wall encompassing the outer edge of said rim adjacent one end of the body of the device to be mounted, inwardly extending substantially parallel device-embracing and support-engaging annular flanges disposed at opposite edges of said annular wall, separate fastener means having a rim portion bearing against the inner face of said support-engaging flange and formed with angularly extending resilient support-engaging fingers adapted for removable snap fastener engagement with the aperture walls of an aperture in a support on which the device may be positioned, and a resilient annular flange extending axially inwardly of said retaining member and curved radially inwardly from the outer periphery of the rim portion of said fastener means for engaging an opposite side of the radially extending projections of the body of the device to be mounted.

2. A replaceable mounting construction for electrical switches and like devices formed with a substantially cylindrical body having a radially projecting annular rim adjacent one end thereof: said mounting comprising a device-retaining member having an annular wall for surrounding the outer peripheral surface of the radially projecting annular rim adjacent one end of the body of the device to be mounted and inwardly extending substantially parallel device-embracing and support-engaging annular flanges disposed at opposite edges of said annular wall, the inner face of said device-embracing flange engaging one face of the radially projecting rim of the device to be mounted, the outer face of said support-engaging flange engaging the surface adjacent the aperture of an apertured support on which the device may be positioned, and a separate fastener means having a ring portion bearing against the inner face of said support-engaging flange and formed with angularly extending resilient support-engaging fingers adapted for removable snap fastener engagement with the aperture walls of the aperture of such a support, and a resilient annular flange extending axially inwardly of said retaining member and curved radially inwardly from the outer periphery of said ring portion for engaging an opposite face of the radially projecting rim of the body of the device to be mounted.

CHARLES L. HALL.

REFERENCES CITED

The following references are of record in the file of this patent:

UNITED STATES PATENTS

| Number | Name | Date |
|---|---|---|
| 1,398,373 | Graesser | Nov. 29, 1921 |
| 1,979,695 | Luce | Nov. 6, 1934 |
| 2,111,713 | Watson | Mar. 22, 1938 |
| 2,125,843 | Hall | Aug. 2, 1938 |
| 2,201,611 | DelCamp | May 21, 1940 |
| 2,235,207 | Eby | Mar. 18, 1941 |